(12) United States Patent
Liao

(10) Patent No.: US 9,360,657 B2
(45) Date of Patent: Jun. 7, 2016

(54) IMAGING LENS MODULE

(71) Applicant: ABILITY OPTO-ELECTRONICS TECHNOLOGY CO., LTD., Taichung (TW)

(72) Inventor: Kuo-Yu Liao, Taichung (TW)

(73) Assignee: Ability Opto-Electronics Technology Co., Ltd., Taichung (TW)

( * ) Notice: Subject to any disclaimer, the term of this patent is extended or adjusted under 35 U.S.C. 154(b) by 28 days.

(21) Appl. No.: 14/520,589

(22) Filed: Oct. 22, 2014

(65) Prior Publication Data

US 2015/0116847 A1    Apr. 30, 2015

(30) Foreign Application Priority Data

Oct. 31, 2013    (TW) .............................. 102139518 A

(51) Int. Cl.
  *G02B 3/02*    (2006.01)
  *G02B 13/00*    (2006.01)
  *G02B 9/34*    (2006.01)

(52) U.S. Cl.
  CPC ................ *G02B 13/004* (2013.01); *G02B 9/34* (2013.01)

(58) Field of Classification Search
  CPC .................................................... G02B 13/004
  USPC ........................................................ 359/715
  See application file for complete search history.

(56) References Cited

U.S. PATENT DOCUMENTS

2015/0109686 A1*    4/2015    Lee ..................... G02B 13/004
                                              359/715

\* cited by examiner

*Primary Examiner* — James Jones
(74) *Attorney, Agent, or Firm* — McNees Wallace & Nurick LLC

(57) ABSTRACT

An imaging lens module includes first, second, third and fourth optical lens elements that are arranged sequentially from an object side to an image side along an optical axis and that respectively have positive, positive, negative and negative refractive powers, and a fixed aperture stop that is disposed between the object side and the second optical lens element. The fourth optical lens element has an object-side surface and an image-side surface that has a concave surface segment near the optical axis. At least one of the object-side surface and the image-side surface of the fourth optical lens element has at least an inflection point.

7 Claims, 16 Drawing Sheets

|  |  | Radius of Curvature | Thickness | Refractive Index | Abbe Number |
|---|---|---|---|---|---|
| First Optical lens element 11 | Object-Side Surface 111 (Fixed aperture stop 2) | 1.164 | 0.404 | 1.535 | 56.07 |
|  | Image-Side Surface 112 | 6.069 | 0.345 |  |  |
| Second Optical lens element 12 | Object-Side Surface 121 | -2.366 | 0.506 | 1.544 | 56.09 |
|  | Image-Side Surface 122 | -0.790 | 0.134 |  |  |
| Third Optical lens element 13 | Object-Side Surface 131 | -0.476 | 0.260 | 1.636 | 23.89 |
|  | Image-Side Surface 132 | -0.777 | 0.080 |  |  |
| Fourth Optical lens element 14 | Object-Side Surface 141 | 0.882 | 0.418 | 1.535 | 56.07 |
|  | Image-Side Surface 142 | 0.693 | 0.357 |  |  |
| Filter 3 | Object-Side Surface 31 | ∞ | 0.300 | 1.517 | 64.17 |
|  | Image-Side Surface 32 | ∞ | 0.297 |  |  |

FIG.4

|   | Object-Side Surface111 | Image-Side Surface112 | Object-Side Surface 121 | Image-Side Surface 122 | Object-Side Surface 131 | Image-Side Surface 132 | Object-Side Surface 141 | Image-Side Surface 142 |
|---|---|---|---|---|---|---|---|---|
| k | -0.14 | 75.00 | 2.94 | -2.81 | 4.34 | -3.30 | -9.45 | -4.46 |
| A | -0.0688297 | -0.0596890 | -0.4189886 | -0.4038309 | -1.2175779 | -0.1040300 | -0.2551097 | -0.1857336 |
| B | 0.41564752 | 0.13466414 | 1.9400652 | -2.1347521 | 2.9579911 | 0.10875861 | -0.0885784 | 0.071825316 |
| C | 1.6605143 | -2.1483137 | -17.811564 | 12.167198 | -2.4009824 | 0.80677508 | 0.35397137 | -0.00316592 |
| D | -24.405125 | 15.700558 | 75.009374 | -32.928306 | -0.4371047 | -1.5370186 | -0.2772618 | -0.01544309 |
| E | 85.751211 | -50.033168 | -148.03614 | 56.916847 | -2.1599654 | 0.68021537 | 0.10896671 | 0.00924333 |
| F | -98.302652 | 78.657534 | 154.1935 | -61.094788 | 6.7443835 | 0.58670694 | -0.02246034 | -0.0025181 |
| G | 1.7022029 | -49.28666 | -70.235417 | 34.342416 | -3.77702855 | -0.44877157 | 0.001193736 | 0.000274760 |

FIG.5

| | | Radius of Curvature | Thickness | Refractive Index | Abbe Number |
|---|---|---|---|---|---|
| First Optical lens element 11 | Object-Side Surface 111 (Fixed aperture stop 2) | 1.513 | 0.440 | 1.535 | 56.07 |
| | Image-Side Surface 112 | 13.316 | 0.470 | | |
| Second Optical lens element 12 | Object-Side Surface 121 | -3.393 | 0.473 | 1.544 | 56.09 |
| | Image-Side Surface 122 | -1.080 | 0.132 | | |
| Third Optical lens element 13 | Object-Side Surface 131 | -0.644 | 0.324 | 1.636 | 23.89 |
| | Image-Side Surface 132 | -0.985 | 0.204 | | |
| Fourth Optical lens element 14 | Object-Side Surface 141 | 1.331 | 0.596 | 1.585 | 29.91 |
| | Image-Side Surface 142 | 0.925 | 0.424 | | |
| Filter 3 | Object-Side Surface 31 | ∞ | 0.300 | 1.517 | 64.17 |
| | Image-Side Surface 32 | ∞ | 0.312 | | |

FIG.9

|   | Object-Side Surface 111 | Image-Side Surface 112 | Object-Side Surface 121 | Image-Side Surface 122 | Object-Side Surface 131 | Image-Side Surface 132 | Object-Side Surface 141 | Image-Side Surface 142 |
|---|---|---|---|---|---|---|---|---|
| k | -0.42 | -18.95 | 6.21 | -3.55 | -5.01 | -2.97 | -12.42 | -5.00 |
| A | -0.0557639 | -0.0500022 | -0.29039328 | -0.2322386 | -0.7003679 | -0.0600005 | -0.1566450 | -0.1033053 |
| B | 0.13023369 | 0.055775953 | 0.98826215 | -0.91818499 | 1.2673757 | 0.05463302 | -0.0374755 | 0.028756851 |
| C | 0.5281318 | -0.7211689 | -5.4592462 | 3.7321909 | -0.746123 | 0.251297705 | 0.10782417 | -0.00129909 |
| D | -5.193998 | 3.2580505 | 16.135229 | -7.1272918 | -0.1075877 | -0.3344703 | -0.0604423 | -0.00333057 |
| E | 12.952171 | -7.6790336 | -23.014833 | 8.8793246 | -0.34392369 | 0.10028124 | 0.0168829725 | 0.001466673 |
| F | -11.989865 | 9.5088826 | 17.305023 | -6.7243477 | 0.707707741 | 0.05951193 | -0.00250498 | -0.0002724 |
| G | 2.268132 | -4.7976432 | -5.5756246 | 2.6339369 | -0.3000663 | -0.03022433 | 0.00016644 | 0.000018607 |

FIG.10

|  |  | Radius of Curvature | Thickness | Refractive Index | Abbe Number |
|---|---|---|---|---|---|
| First Optical lens element 11 | Object-Side Surface111 (Fixed aperture stop 2) | 0.857 | 0.323 | 1.535 | 56.07 |
|  | Image-Side Surface112 | 3.699 | 0.294 |  |  |
| Second Optical lens element 12 | Object-Side Surface 121 | -1.512 | 0.300 | 1.544 | 56.09 |
|  | Image-Side Surface 122 | -0.707 | 0.112 |  |  |
| Third Optical lens element 13 | Object-Side Surface 131 | -0.368 | 0.196 | 1.636 | 23.89 |
|  | Image-Side Surface 132 | -0.465 | 0.022 |  |  |
| Fourth Optical lens element 14 | Object-Side Surface 141 | 0.625 | 0.239 | 1.535 | 56.07 |
|  | Image-Side Surface 142 | 0.432 | 0.235 |  |  |
| Filter 3 | Object-Side Surface 31 | ∞ | 0.210 | 1.517 | 64.17 |
|  | Image-Side Surface 32 | ∞ | 0.111 |  |  |
| Cover Glass 5 | Object-Side Surface51 | ∞ | 0.400 | 1.517 | 64.17 |
|  | Image-Side Surface 52 |  | 0.045 |  |  |

FIG.14

|   | Object-Side Surface 111 | Image-Side Surface 112 | Object-Side Surface 121 | Image-Side Surface 122 | Object-Side Surface 131 | Image-Side Surface 132 | Object-Side Surface 141 | Image-Side Surface 142 |
|---|---|---|---|---|---|---|---|---|
| k | -0.13 | 32.73 | 4.30 | -2.96 | -4.59 | -3.44 | -8.83 | -5.08 |
| A | -0.1794194 | -0.1401748 | -0.91556422 | -0.7291824 | -2.388551 | -0.2998344 | -0.4835359 | -0.3998442 |
| B | 1.5176966 | 0.3181925 | 6.8364923 | -7.0594185 | 10.305472 | 0.37573693 | -0.3085364 | 0.25868548 |
| C | 11.615856 | -14.15416 | -100.74128 | 67.156719 | -13.557866 | 4.8236712 | 1.9399387 | -0.02166081 |
| D | -219.95927 | 132.46845 | 659.3257 | -295.95451 | -5.7876439 | -13.462441 | -2.4926439 | -0.1413879 |
| E | 1174.618 | -732.73009 | -2165.6152 | 830.87765 | -29.33531 | 9.6823567 | 1.5982646 | 0.13366108 |
| F | -2658.7787 | 1978.6868 | 3863.6195 | -1465.7991 | 186.54086 | 12.326953 | -0.53340006 | -0.0563131 |
| G | 2031.885 | -2234.5261 | -2947.611 | 1439.1948 | -214.35382 | -17.378747 | 0.07412826 | 0.010095158 |

FIG.15

| Parameters | First Preferred Embodiment | Second Preferred Embodiment | Third Preferred Embodiment |
| --- | --- | --- | --- |
| TL | 3.1 | 3.68 | 2.49 |
| Dg | 3.672 | 4.4 | 2.876 |
| f | 2.23 | 2.67 | 1.75 |
| ct1 | 0.404 | 0.44 | 0.323 |
| ct2 | 0.506 | 0.473 | 0.3 |
| ct3 | 0.26 | 0.324 | 0.196 |
| ct4 | 0.418 | 0.596 | 0.239 |
| TL/Dg | 0.84 | 0.84 | 0.87 |
| TL/f | 1.39 | 1.38 | 1.42 |
| (ct1+ct2)/ct3 | 3.50 | 2.82 | 3.18 |
| (ct1+ct2+ct4)/ct3 | 5.11 | 4.66 | 4.40 |
| ct1/ct2 | 0.80 | 0.93 | 1.08 |
| Nd2 | 1.544 | 1.544 | 1.544 |
| Nd3 | 1.636 | 1.636 | 1.636 |
| Vd2 | 56.09 | 56.09 | 56.09 |
| Vd3 | 23.89 | 23.89 | 23.89 |

IMAGING LENS MODULE

CROSS-REFERENCE TO RELATED APPLICATION

This application claims priority of Taiwanese Application No. 102139518, filed on Oct. 31, 2013.

BACKGROUND OF THE INVENTION

1. Field of the Invention

The present invention relates to an imaging lens module.

2. Description of the Related Art

An imaging lens set is generally adopted in a mobile phone, a smart phone, a tablet computer, a notebook computer or an imaging lens assembly. With the rapid development of technology, these electronic devices are designed to be increasingly thinner. Therefore, the imaging lens set for these electronic devices should be made correspondingly smaller as well. Moreover, the imaging lens set should be developed more wide-angle in order to increase a resolving power thereof, such as a resolution of 1920*1080 full HD (High Definition).

SUMMARY OF THE INVENTION

Therefore, an object of the present invention is to provide an imaging lens module that has an alternative four-lens structure.

Accordingly, an imaging lens module of the present invention includes an optical lens set and a fixed aperture stop. The optical lens set includes first, second, third and fourth optical lens elements that are arranged sequentially from an object side to an image side along an optical axis of the imaging lens module.

The first optical lens element has a positive refractive power near the optical axis. The first optical lens element has a convex object-side surface that faces the object side, and an image-side surface that faces the image side. At least one of the object-side surface and the image-side surface of the first optical lens element is aspheric. The second optical lens element has a positive refractive power near the optical axis. The second optical lens element has an object-side surface that faces the object side, and a convex image-side surface that faces the image side. At least one of the object-side surface and the image-side surface of the second optical lens element is aspheric. The third optical lens element has a negative refractive power near the optical axis. The third optical lens element has a concave object-side surface that faces the object side, and a convex image-side surface that faces the image side. At least one of the object-side surface and the image-side surface of the third optical lens element is aspheric. The fourth optical lens element has a negative refractive power near the optical axis. The fourth optical lens element has an object-side surface that faces the object side, an image-side surface that faces the image side and that has a concave surface segment near the optical axis, and a peripheral surface that interconnects the object-side surface and the image-side surface. At least one of the object-side surface and the image-side surface of the fourth optical lens element is aspheric and has at least one inflection point between the optical axis and the peripheral surface.

The fixed aperture stop is disposed between the object side and the second optical lens element.

BRIEF DESCRIPTION OF THE DRAWINGS

Other features and advantages of the present invention will become apparent in the following detailed description of the preferred embodiment with reference to the accompanying drawings, of which:

FIG. 4 shows a table of optical parameters for optical lens elements, a fixed aperture stop and a filter of the first preferred embodiment;

FIG. 5 shows a table of parameters for aspheric surfaces of the first preferred embodiment;

FIG. 9 shows a table of optical parameters for optical lens elements, a fixed aperture stop and a filter of the second preferred embodiment;

FIG. 10 shows a table of parameters for aspheric surfaces of the second preferred embodiment;

FIG. 14 shows a table of optical parameters for optical lens elements, a fixed aperture stop, a filter and a cover glass of the third preferred embodiment;

FIG. 15 shows a table of parameters for aspheric surfaces of the third preferred embodiment; and FIG. 16 shows a table of optical parameters for the first, second and third preferred embodiments of the optical lens module according to the present invention.

DETAILED DESCRIPTION OF THE PREFERRED EMBODIMENTS

Figure 1:
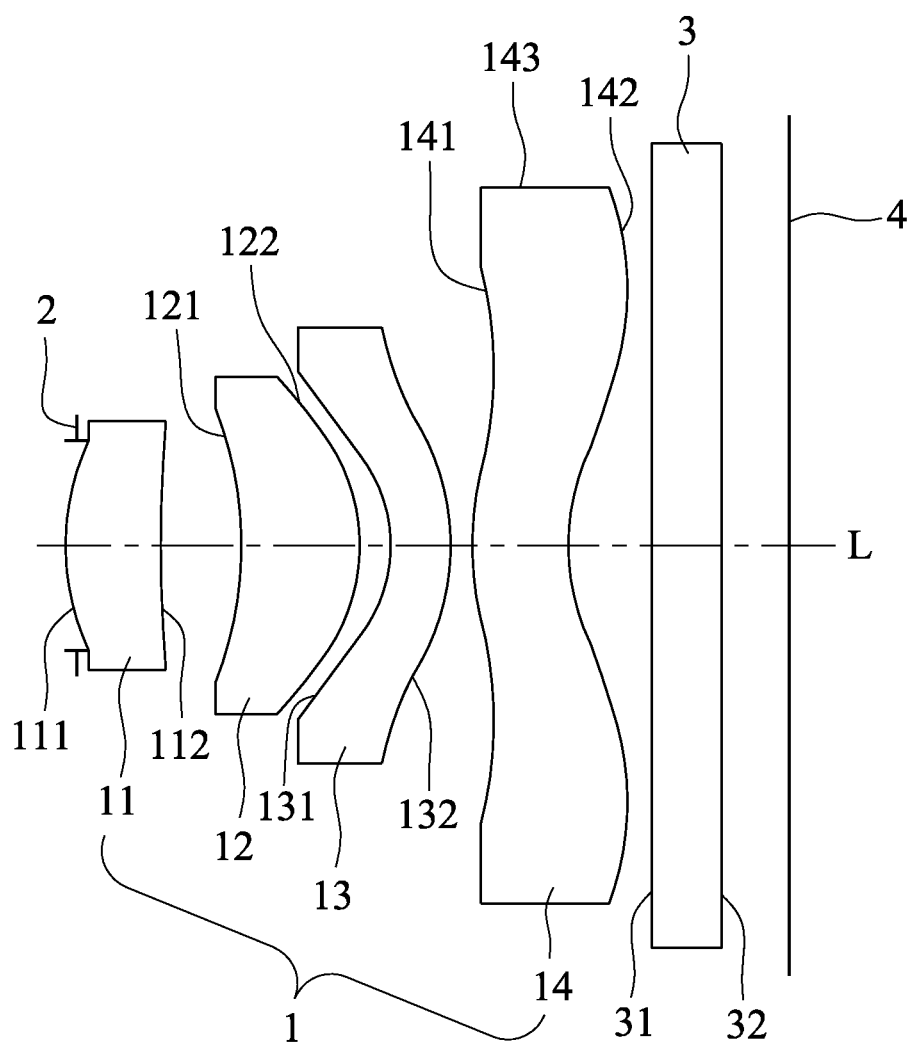
FIG. 1 is a schematic view of a first preferred embodiment of an imaging lens module according to the present invention.

Before the present invention is described in greater detail, it should be noted that like elements are denoted by the same reference numerals throughout the disclosure.

Referring to FIG. 1, an imaging lens module of the present invention includes an optical lens set 1 and a fixed aperture stop 2, and is capable of forming an image on an imaging plane 4.

The optical lens set 1 includes first, second, third and fourth optical lens elements 11, 12, 13, 14 that are arranged sequentially from an object side to an image side along an optical axis (L) of the imaging lens module.

The first optical lens element 11 has a positive refractive power near the optical axis (L). The first optical lens element 11 has a convex object-side surface 111 that faces the object side, and an image-side surface 112 that faces the image side. At least one of the object-side surface 111 and the image-side surface 112 of the first optical lens element 11 is aspheric. The second optical lens element 12 has a positive refractive power near the optical axis (L). The second optical lens element 12 has an object-side surface 121 that faces the object side, and a convex image-side surface 122 that faces the image side. At least one of the object-side surface 121 and the image-side surface 122 of the second optical lens element 12 is aspheric. The third optical lens element 13 has a negative refractive power near the optical axis (L). The third optical lens element 13 has a concave object-side surface 131 that faces the object side, and a convex image-side surface 132 that faces the image side. At least one of the object-side surface 131 and the image-side surface 132 of the third optical lens element 13 is aspheric. The fourth optical lens element 14 has a negative refractive power near the optical axis (L). The fourth optical lens element 14 has an object-side surface 141 that faces the object side, an image-side surface 142 that faces the image side and that has a concave surface segment near the optical axis (L), and a peripheral surface 143 that interconnects the object-side surface 141 and the image-side surface 142. At least one of the object-side surface 141 and the image-side surface 142 of the fourth optical lens element 14 is aspheric and has at least one inflection point between the optical axis (L) and the peripheral surface 143.

The fixed aperture stop 2 is disposed between the object side and the second optical lens element 12.

The imaging lens module satisfies the following optical conditions:

$$1 < TL/f < 2 \tag{eq1}$$

$$0.5 < TL/Dg < 2 \tag{eq2}$$

$$0.5 < ct1/ct2 < 2 \tag{eq3}$$

$$(ct1+ct2)/ct3 > 2 \tag{eq4}$$

$$(ct1+ct2+ct4)/ct3 > 3 \tag{eq5}$$

$$Nd2 < 1.66 \tag{eq6}$$

$$Nd3 > 1.56 \tag{eq7}$$

$$Vd2 > 33 \tag{eq8}$$

$$Vd3 < 33 \tag{eq9}$$

in which, TL represents a distance from the imaging plane 4 to the object-side surface 111 of the first optical lens element 11 along the optical axis (L), f represents a focal length of the imaging lens module, Dg represents a length of a diagonal line of a maximum viewing angle on the imaging plane 4, ct1 represents a thickness of the first optical lens element 11 along the optical axis (L), ct2 represents a thickness of the second optical lens element 12 along the optical axis (L), ct3 represents a thickness of the third optical lens element 13 along the optical axis (L), ct4 represents a thickness of the fourth optical lens element 14 along the optical axis (L), Nd2 represents a refractive index of the second optical lens element 12 at 587.6 nm wavelength, Nd3 represents a refractive index of the third optical lens element 13 at 587.6 nm wavelength, Vd2 represents an Abbe number of the second optical lens element 12 at 587.6 nm wavelength, and Vd3 represents an Abbe number of the third optical lens element 13 at 587.6 nm wavelength.

Preferably, the imaging lens module satisfies the following optical conditions:

$$1.3 < TL/f < 1.5;$$

$$0.5 < TL/Dg < 0.9;$$

$$2.5 < (ct1+ct2)/ct3 < 4.0; \text{ and}$$

$$4.0 < (ct1+ct2+ct4)/ct3 < 5.5.$$

According to Equation 1 (eq1), the value of TL/f is directly proportional to TL when f is fixed, and is inversely proportional to f when TL is fixed. Specifically, when the focal length of the imaging lens module is constant, the distance from the object-side surface 111 of the first optical lens element 11 to the imaging plane 4 along the optical axis (L) (i.e., an overall optical length of the imaging lens module) may be shortened due to the upper limit of 2 that is imposed on the value of TL/f, thereby leading to an imaging lens module with a smaller size. On the other hand, when the overall optical length of the imaging lens module is constant, the focal length of the imaging lens module may be shortened due to the lower limit of 1 that is imposed on the value of TL/f, thereby leading to an imaging lens module with a wider viewing angle.

In addition, an aspheric surface of the present invention satisfies the following equation:

$$z = \frac{ch^2}{1+[1-(k+1)c^2h^2]^{0.5}} + Ah^4 + Bh^6 + Ch^8 + Dh^{10} + Eh^{12} + Fh^{14} + Gh^{16} + Hh^{18} + Jh^{20} + \ldots , \tag{eq 10}$$

in which, z is the z-component of the displacement of the aspheric surface from the vertex of the aspheric surface along the optical axis (L), at a distance h from the optical axis (L); k is a conic constant; c is the reciprocal of a radius of curvature; and A, B, C, D, E, F, G, H and J, etc. are aspheric coefficients. The aspheric surface may correct aberrations and decrease tolerance sensitivity, and may also contribute to the wider viewing angle of the imaging lens module.

First Preferred Embodiment

FIG. 1 is a schematic view of a first preferred embodiment of the imaging lens module according to the present invention. Each of the object-side surfaces 111, 121, 131, 141 and the image-side surfaces 112, 122, 132, 142 of the first, second, third and fourth optical lens elements 11, 12, 13, 14 of the first preferred embodiment is aspheric. It is further illustrated that the image-side surface 112 of the first optical lens element 11 is concave, the object-side surface 121 of the second optical lens element 12 is concave, and the object-side surface 141 of the fourth optical lens element 14 has a convex surface segment near the optical axis (L). In this preferred embodiment, each of the object-side surface 141 and the image-side surface 142 of the fourth optical lens element 14 has one inflection point, the fixed aperture stop 2 is disposed at the object-side surface 111 of the first optical lens element 11, and the imaging lens module further includes a filter 3 that is disposed between the fourth optical lens element 14 and the imaging plane 4, and that has an object-side surface 31 facing the object side and an image-side surface 32 facing the image side.

Figure 2:
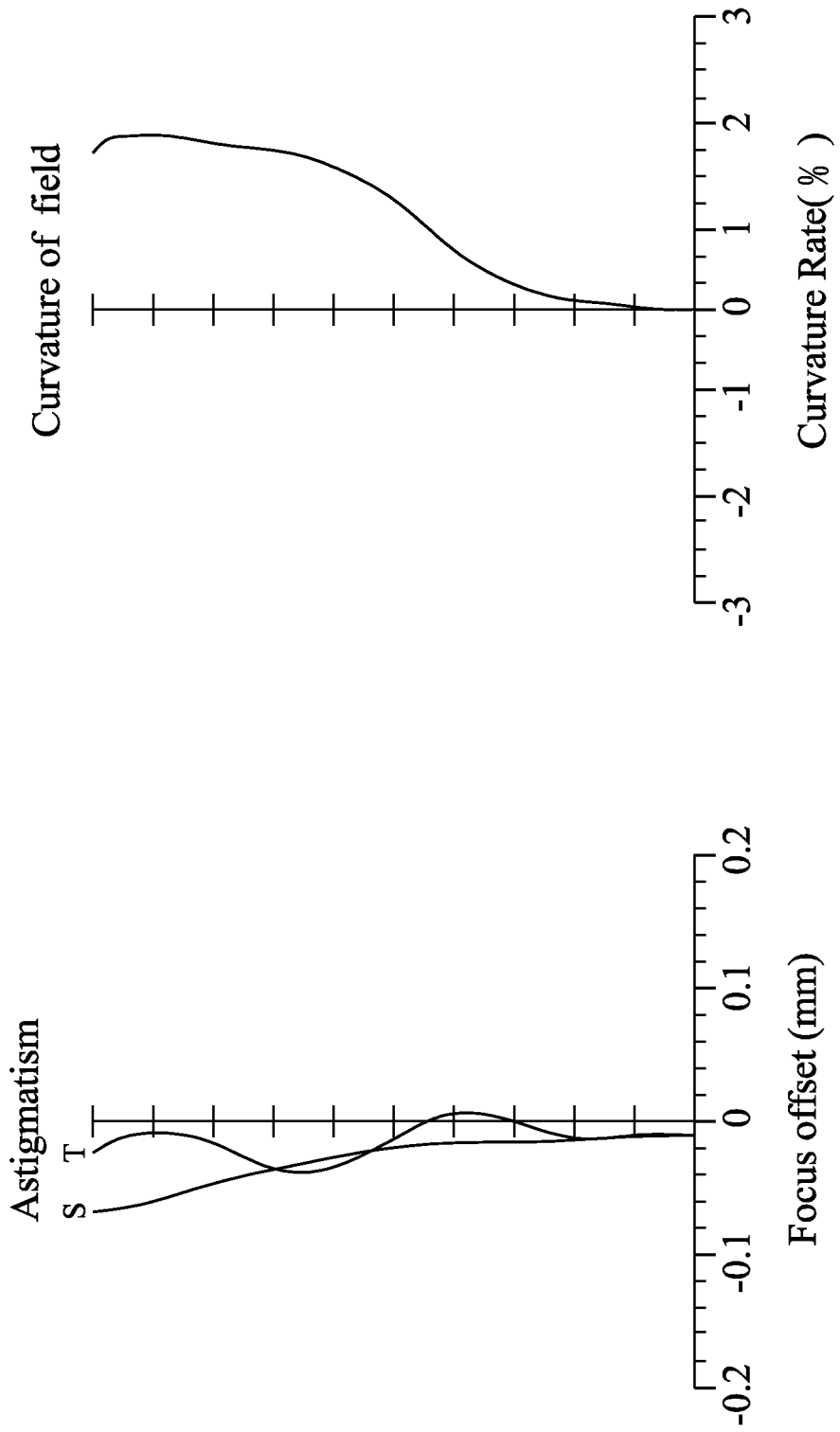
FIG. 2 shows simulation results of astigmatism and curvature of field of the first preferred embodiment.
Figure 3:
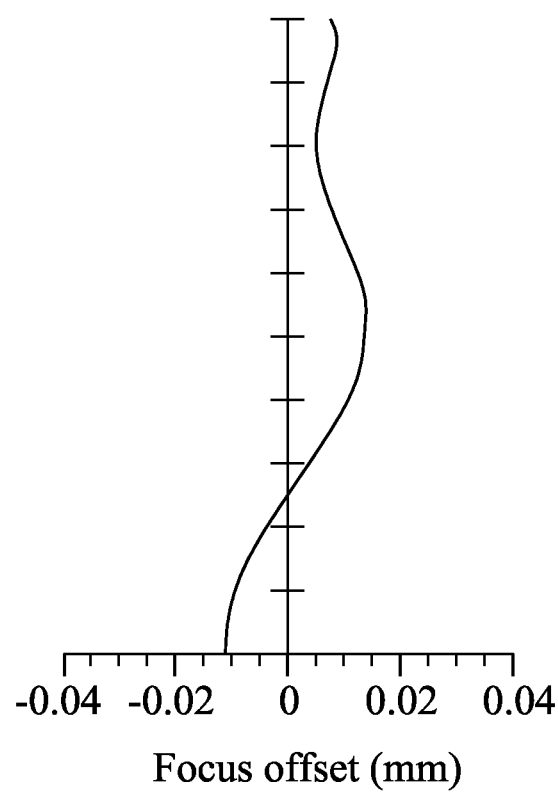
FIG. 3 shows a simulation result of spherical aberration of the first preferred embodiment.

FIGS. 2 and 3 respectively show simulation results of astigmatism, curvature of field and spherical aberration of the first preferred embodiment. FIG. 4 shows a table of optical parameters for the optical lens elements 11, 12, 13, 14, the fixed aperture stop 2 and the filter 3 of the first preferred embodiment. FIG. 5 shows a table of parameters for the aspheric surfaces 111, 112, 121, 122, 131, 132, 141, 142 of the first preferred embodiment.

Referring further to FIG. 16, parameters of the first preferred embodiment of the imaging lens module are shown to satisfy Equations 1 to 9 (eq1 to eq9).

Second Preferred Embodiment

Figure 6:
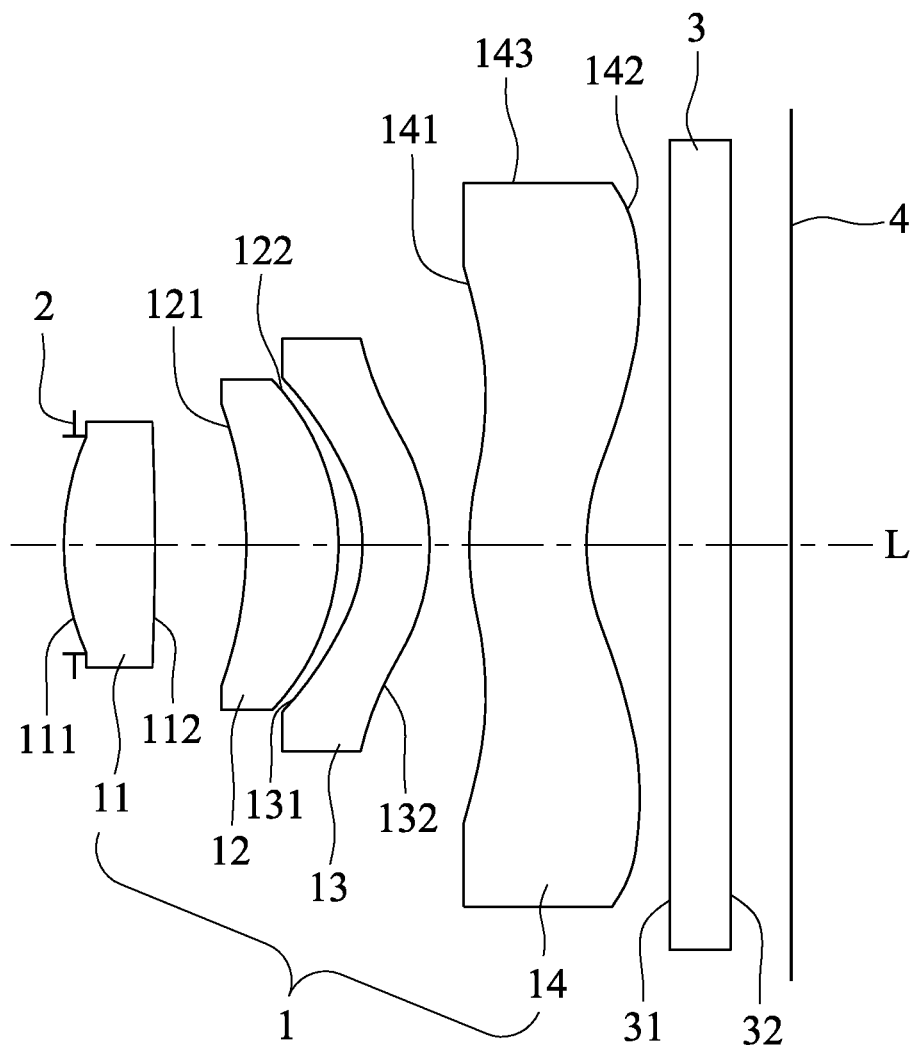
FIG. 6 is a schematic view of a second preferred embodiment of the imaging lens module according to the present invention.

FIG. 6 is a schematic view of a second preferred embodiment of the imaging lens module according to the present invention. Each of the object-side surfaces 111, 121, 131, 141 and the image-side surfaces 112, 122, 132, 142 of the first, second, third and fourth optical lens elements 11, 12, 13, 14 of the second preferred embodiment is aspheric. It is further illustrated that the image-side surface 112 of the first optical lens element 11 is concave, the object-side surface 121 of the second optical lens element 12 is concave, and the object-side surface 141 of the fourth optical lens element 14 has a convex surface segment near the optical axis (L). In this preferred embodiment, each of the object-side surface 141 and the image-side surface 142 of the fourth optical lens element 14 has one inflection point, the fixed aperture stop 2 is disposed at the object-side surface 111 of the first optical lens element 11, and the imaging lens module further includes a filter 3 that is disposed between the fourth optical lens element 14 and the imaging plane 4, and that has an object-side surface 31 facing the object side and an image-side surface 32 facing the image side.

Figure 7:
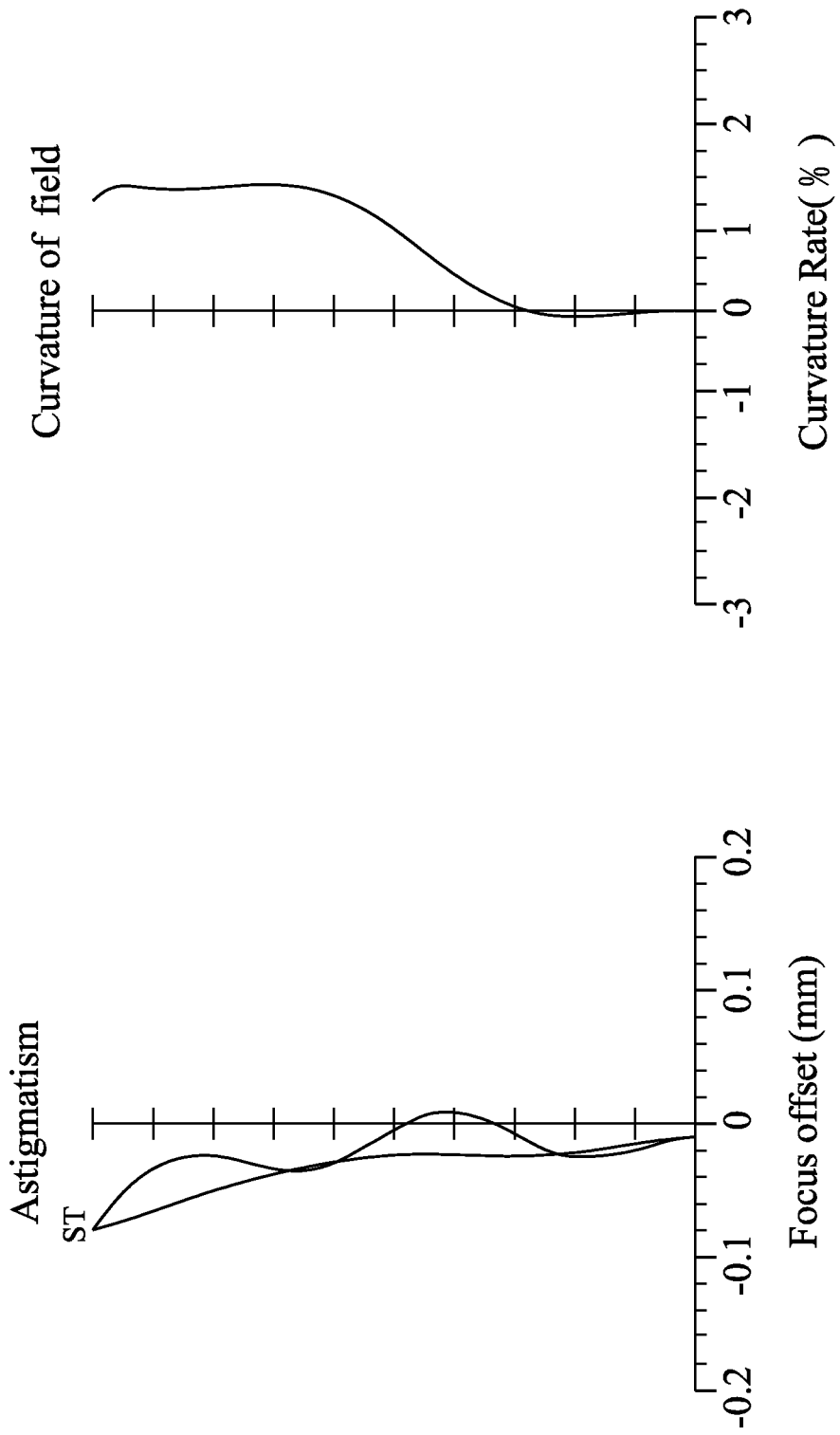
FIG. 7 shows simulation results of astigmatism and curvature of field of the second preferred embodiment.
Figure 8:
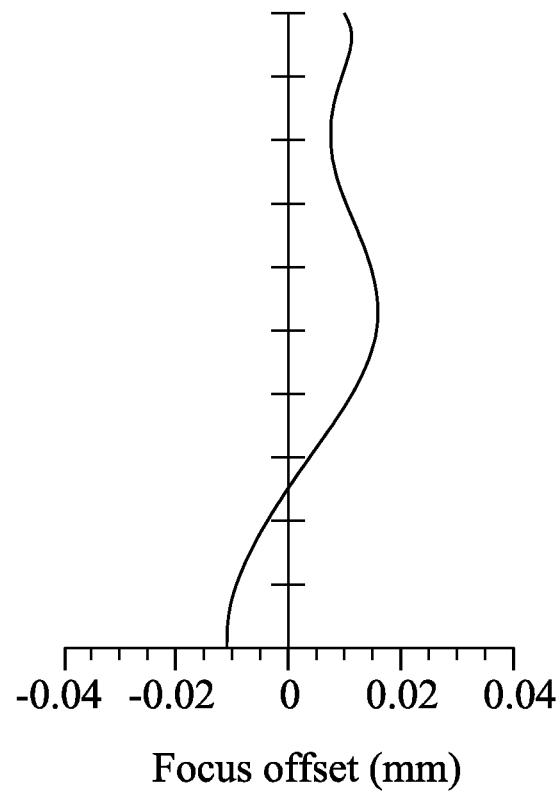
FIG. 8 shows a simulation result of spherical aberration of the second preferred embodiment.

FIGS. 7 and 8 respectively show simulation results of astigmatism, curvature of field and spherical aberration of the second preferred embodiment. FIG. 9 shows a table of optical parameters for the optical lens elements 11, 12, 13, 14, the fixed aperture stop 2 and the filter 3 of the second preferred embodiment. FIG. 10 shows a table of parameters for the aspheric surfaces 111, 112, 121, 122, 131, 132, 141, 142 of the second preferred embodiment.

Referring further to FIG. 16, parameters of the second preferred embodiment of the imaging lens module are shown to satisfy Equations 1 to 9 (eq1 to eq9).

Third Preferred Embodiment

Figure 11:
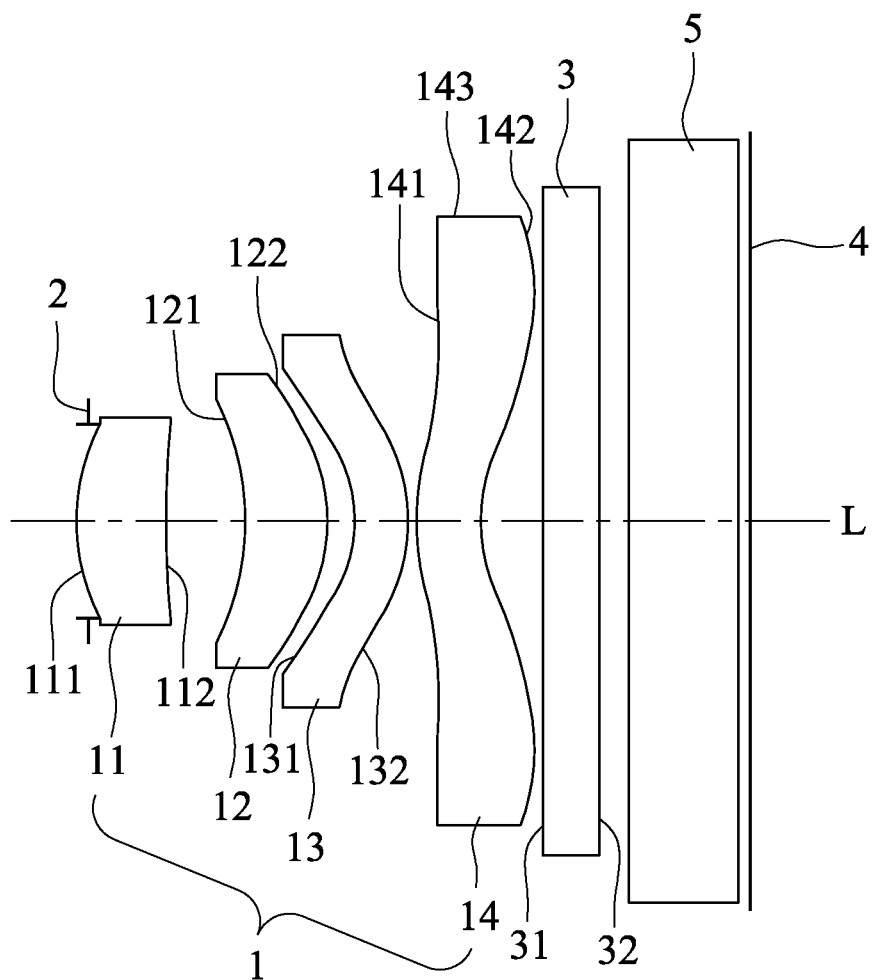
FIG. 11 is a schematic view of a third preferred embodiment of the imaging lens module according to the present invention.

FIG. 11 is a schematic view of a third preferred embodiment of the imaging lens module according to the present invention. The imaging lens module in this preferred embodiment further includes a filter 3 and a cover glass 5. Each of the object-side surfaces 111, 121, 131, 141 and the image-side surfaces 112, 122, 132, 142 of the first, second, third and fourth optical lens elements 11, 12, 13, 14 of the third preferred embodiment is aspheric. It is further illustrated that the image-side surface 112 of the first optical lens element 11 is concave, the object-side surface 121 of the second optical lens element 12 is concave, and the object-side surface 141 of the fourth optical lens element 14 has a convex surface segment near the optical axis (L). In this preferred embodiment, each of the object-side surface 141 and the image-side surface 142 of the fourth optical lens element 14 has one inflection point, the fixed aperture stop 2 is disposed at the object-side surface 111 of the first optical lens element 11, the filter 3 is disposed between the fourth optical lens element 14 and the imaging plane 4, and the cover glass 5 is disposed between the filter 3 and the imaging plane 4.

Figure 12:
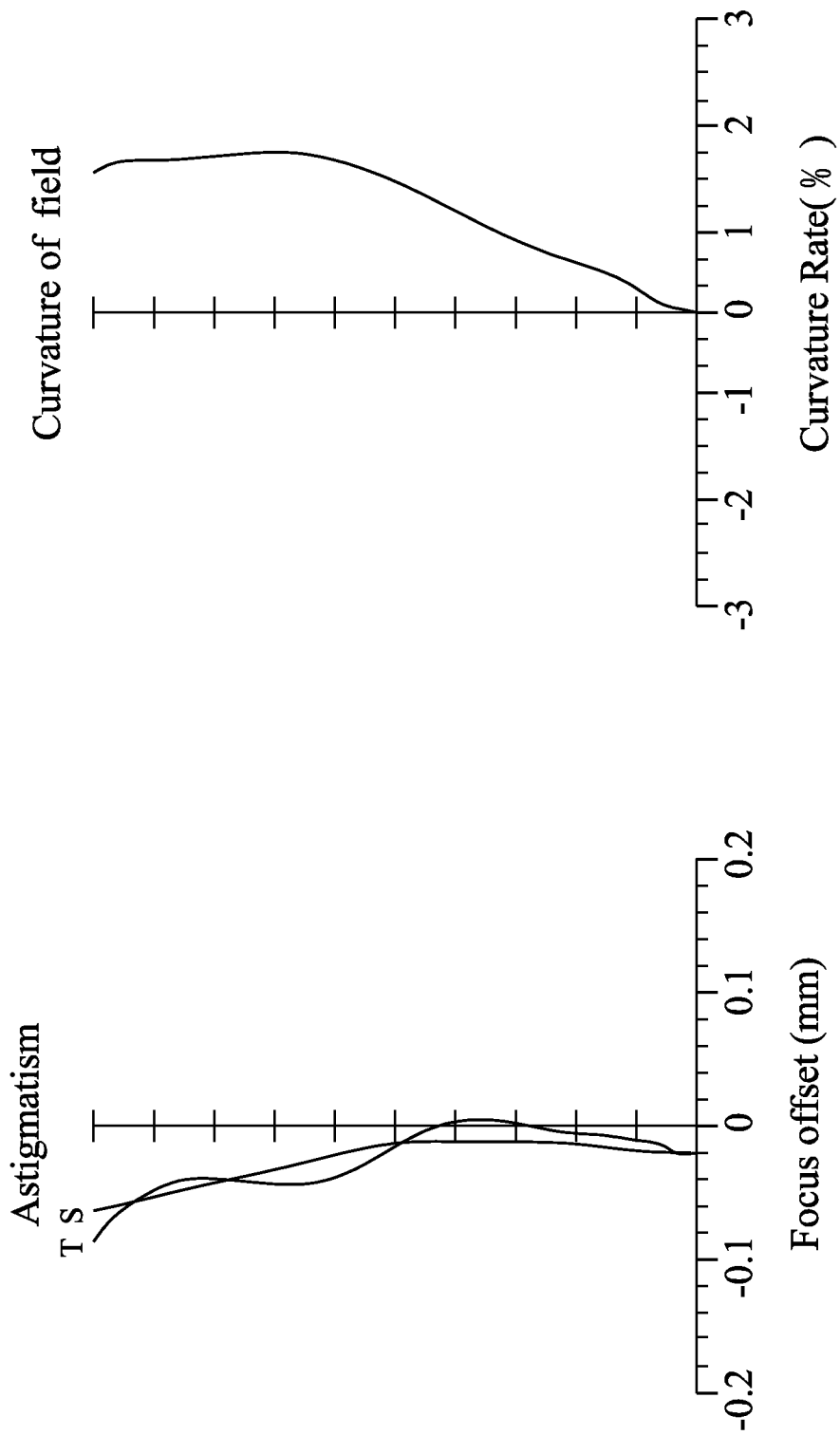
FIG. 12 shows simulation results of astigmatism and curvature of field of the third preferred embodiment.
Figure 13:
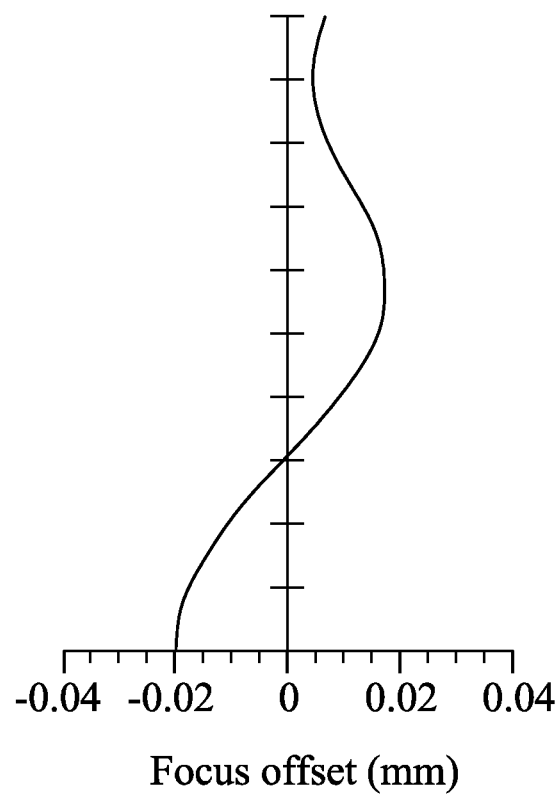
FIG. 13 shows a simulation result of spherical aberration of the third preferred embodiment.

FIGS. 12 and 13 respectively show simulation results of astigmatism, curvature of field and spherical aberration of the third preferred embodiment. FIG. 14 shows a table of optical parameters for the optical lens elements 11, 12, 13, 14, the fixed aperture stop 2, the filter 3 and the cover glass 5 of the third preferred embodiment. FIG. 15 shows a table of parameters for the aspheric surfaces 111, 112, 121, 122, 131, 132, 141, 142 of the third preferred embodiment.

Referring further to FIG. 16, parameters of the third preferred embodiment of the imaging lens module are shown to satisfy Equations 1 to 9 (eq1 to eq9).

To conclude, advantageous features of the imaging lens module according to the present invention are as follows:

1. The first, second, third and fourth optical lens elements 11, 12, 13, 14 of the imaging lens module of the present invention respectively have positive, positive, negative and negative refractive powers. Moreover, the image-side surface 122 of the second optical lens element 12 is convex, and the object-side surface 131 of the third optical lens element 13 is concave. As a result, a distance between the second the third optical lens elements 12, 13 is effectively shortened.

2. The imaging lens module of the present invention satisfies the equation (1): 1<TL/f<2. The upper limit of 2 imposed on the value of TL/f allows the imaging lens module to have a smaller size under the same focal length as the prior art. The lower limit of 1 imposed on the value of TL/f allows the imaging lens module to have a wider viewing angle under the same overall optical length as the prior art.

3. The imaging lens module of the present invention satisfies the equations (2) to (10), thereby increasing a resolving power thereof, enlarging the maximum viewing angle on the imaging plane 4, and decreasing the overall thickness thereof.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. An imaging lens module, comprising:
    an optical lens set including first, second, third and fourth optical lens elements that are arranged sequentially from an object side to an image side along an optical axis of said imaging lens module,
        said first optical lens element having a positive refractive power near the optical axis, said first optical lens element having a convex object-side surface that faces the object side, and an image-side surface that faces the image side, wherein at least one of said object-side surface and said image-side surface of said first optical lens element is aspheric,
        said second optical lens element having a positive refractive power near the optical axis, said second optical lens element having an object-side surface that faces the object side, and a convex image-side surface that faces the image side, wherein at least one of said object-side surface and said image-side surface of said second optical lens element is aspheric,
        said third optical lens element having a negative refractive power near the optical axis, said third optical lens element having a concave object-side surface that faces the object side, and a convex image-side surface that faces the image side, wherein at least one of said object-side surface and said image-side surface of said third optical lens element is aspheric,
        said fourth optical lens element having a negative refractive power near the optical axis, said fourth optical lens element having an object-side surface that faces the object side, an image-side surface that faces the image side and that has a concave surface segment near the optical axis and a peripheral surface that interconnects said object-side surface and said image-side surface, wherein at least one of said object-side surface and said image-side surface of said fourth optical lens element is aspheric and has at least one inflection point between the optical axis and said peripheral surface; and
    a fixed aperture stop disposed between the object side and said second optical lens element;

wherein the imaging lens module satisfies the following optical condition:

$1 < TL/f < 2$, in which, TL represents a distance from an imaging plan to said object-side surface of said first optical lens element along the optical axis and f represents a focal length of said imaging lens module.

2. The imaging lens module as claimed in claim 1, satisfying the following optical condition:

$0.5 < TL/Dg < 2$, in which, TL represents a distance from an imaging plane to said object-side surface of said first optical lens element along the optical axis, and Dg represents a length of a diagonal line of a maximum viewing angle on the imaging plane.

3. The imaging lens module as claimed in claim 1, satisfying the following optical condition:

$0.5 < ct1/ct2 < 2$, in which, ct1 and ct2 represent thicknesses of said first and second optical lens elements along the optical axis, respectively.

4. The imaging lens module as claimed in claim 3, satisfying the following optical conditions:

$(ct1+ct2)/ct3 > 2.0$; and $(ct1+ct2+ct4)/ct3 > 3.0$, in which, ct1 to ct4 represent thicknesses of said first to fourth optical lens elements along the optical axis, respectively.

5. The imaging lens module as claimed in claim 1, satisfying the following optical conditions:

$Nd2 < 1.66$;

$Nd3 > 1.56$;

$Vd2 > 33$; and $Vd3 < 33$, in which, Nd2 and Nd3 represent refractive indices of said second and third optical lens elements at 587.6 nm wavelength, respectively, and Vd2 and Vd3 represent Abbe numbers of said second and third optical lens elements at 587.6 nm wavelength, respectively.

6. The imaging lens module as claimed in claim 1, satisfying the following optical conditions:

$1.3 < TL/f < 1.5$; and $0.5 < TL/Dg < 0.9$, in which, f represents a focal length of said imaging lens module, TL represents a distance from an imaging plane to said object-side surface of said first optical lens element along the optical axis, and Dg represents a length of a diagonal line of a maximum viewing angle on the imaging plane.

7. The imaging lens module as claimed in claim 1, satisfying the following optical conditions:

$2.5 < (ct1+ct2)/ct3 < 4.0$; and $4.0 < (ct1+ct2+ct4)/ct3 < 5.5$, in which, ct1 to ct4 represent thicknesses of said first to fourth optical lens elements along the optical axis, respectively.

* * * * *